United States Patent [19]

Pravettone

[11] 4,357,728
[45] Nov. 9, 1982

[54] DUST PAN AND REFUSE CONTAINER

[76] Inventor: John P. Pravettone, 23807 Karen, Warren, Mich. 48091

[21] Appl. No.: 171,976

[22] Filed: Jul. 24, 1980

[51] Int. Cl.³ ............................................. A47L 13/52
[52] U.S. Cl. ............................... 15/257.4; 15/257.9; 141/108; 141/314; 248/98; 248/99; 280/47.35
[58] Field of Search ................ 15/257.1, 257.4, 257.9; 248/98, 99; 141/10, 108, 314, 316, 391; 280/47.34, 47.35, 47.17, 47.2; D12/25, 27, 24; 294/1 R

[56] References Cited

U.S. PATENT DOCUMENTS

| | | | |
|---|---|---|---|
| 430,355 | 6/1890 | Stone | 141/314 X |
| 808,739 | 1/1906 | Focht | 280/47.35 X |
| 1,266,522 | 5/1918 | Oldham | 141/314 X |
| 2,818,988 | 1/1958 | Dunkin | 280/47.2 X |
| 2,992,011 | 7/1961 | Becan | D12/24 |
| 3,106,303 | 10/1963 | Finocchiaro | 15/257.1 X |
| 3,170,183 | 2/1965 | Leatherman | 15/257.1 |
| 3,697,030 | 10/1972 | Schultz | 15/257.1 X |
| 3,875,981 | 4/1975 | Brenner | 249/98 X |
| 3,934,803 | 1/1976 | Paulus | 15/257.1 X |
| 4,006,928 | 2/1977 | Beugin | 15/257.1 X |
| 4,052,764 | 10/1977 | Groff | 248/99 X |

FOREIGN PATENT DOCUMENTS 1108917 9/1955 France ............................... 15/257.4

Primary Examiner—Billy J. Wilhite
Attorney, Agent, or Firm—Remy J. VanOphem

[57] ABSTRACT

The present specification discloses a combination dust pan and refuse container constructed of inexpensive lightweight materials which is highly transportable and repositionable from an upright refuse transporting position to a horizontal refuse collecting position. The combination pan and container is made up of a framework which distends and substantially encloses a conventional disposable trash bag, four circumferentially spaced ground contacting wheels and a dust pan which depends outwardly from the frame near the mouth of the bag. In the transporting position, all four wheels contact the ground and provide a stable base. In the collecting position, the outwardmost edge of the dust pan and two of the wheels which are on a common axle contact the ground. A handle is provided which projects upwardly in both the transporting and collecting positions to facilitate mobility of the pan/container combination. In the preferred embodiment of the invention, mesh type supporting frames are included for heavy duty application and enhanced bag protection. In the alternative embodiment of the invention, the features of a collapsible container and a dimensionally adjustable framework are disclosed.

7 Claims, 4 Drawing Figures

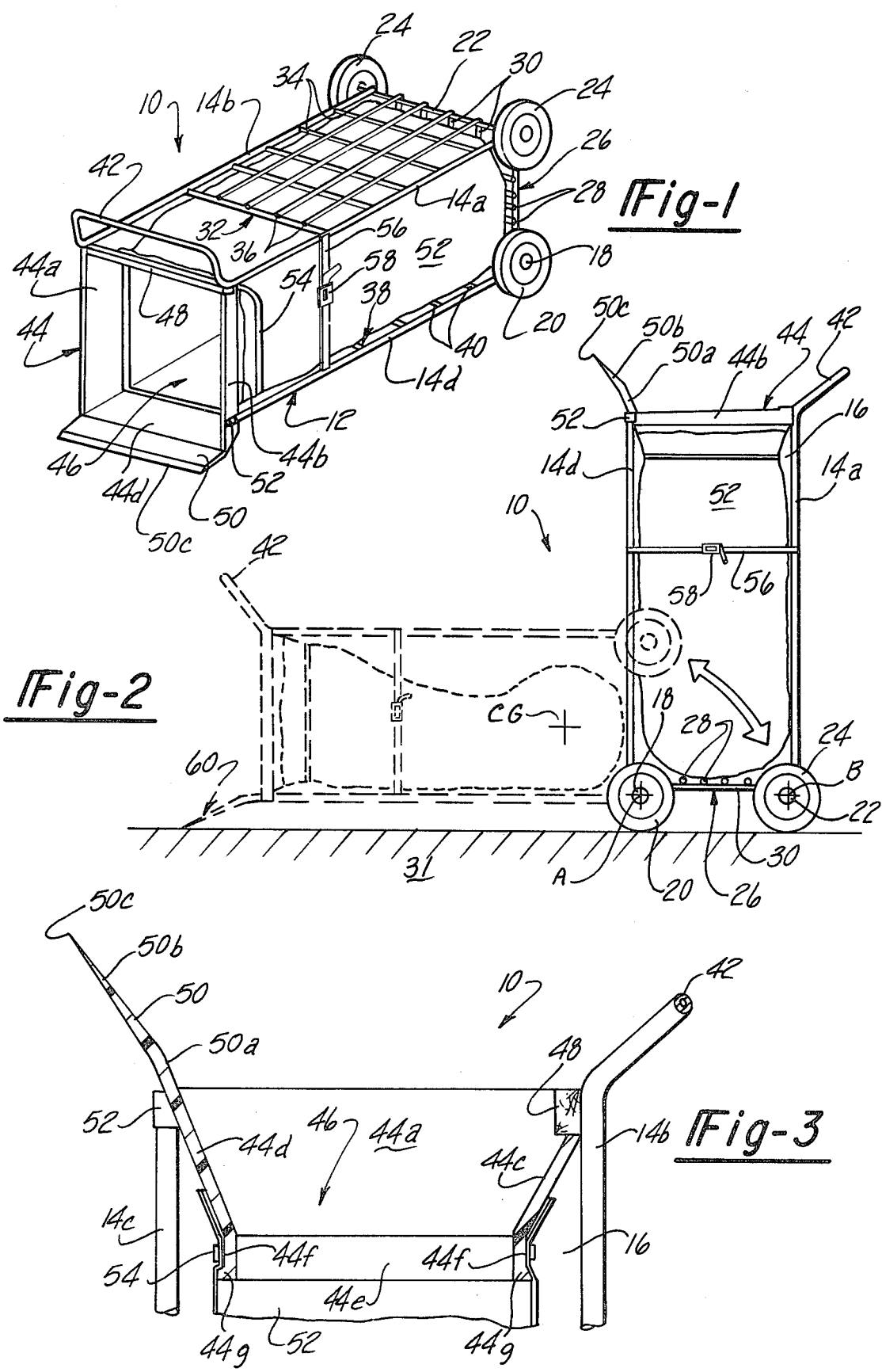

DUST PAN AND REFUSE CONTAINER

INTRODUCTION

The present invention generally relates to containers for the collection of refuse, trash, leaves and the like. More particularly, the present invention relates to such containers which employ conventional disposable plastic trash bags and are intended for household application by the general consuming public.

BACKGROUND OF THE INVENTION

Any number of containers, collectors and transporters for refuse such as garbage, leaves, grass clippings and the like have been suggested and commercialized in the past. These range from commercial units weighing hundreds of pounds and requiring special transport trucks, to widely marketed inexpensive consumer oriented products. The generally available commercial units typically prove to be unacceptable for household applications due to size and, more importantly, weight and cost considerations. Containers which are structurally sound, versatile and convenient to use are generally cost ineffective for household type applications. Additionally, units designed for commercial application are often unsatisfactory for household use inasmuch as they are structurally complex and may be hazardous to an untrained user.

Refuse containers for noncommercial or household applications which are inexpensive and relatively easy to employ abound. However, such prior art containers often have a number of shortcomings. Many containers which have received consumer acceptance attribute success only to mass marketing such as through television and newspaper advertising rather than through engineering and design excellence. Such containers often are not well engineered and employ inferior or substandard materials. Additionally, such consumer oriented prior art containers are often intended for only a single light duty application such as collecting leaves and are totally unacceptable for others such as receiving relatively heavy grass clippings either from thatching or mowing the lawn. A consumer is often tempted to use the container for other nonintended applications, causing it to break outright or substantially lessen its useful life. Finally, single application containers often are not adjustable to accommodate disposable trash bags of varying dimensions and volumes.

Many refuse containers intended for home use, although inexpensive, are extremely difficult to use and result in a net loss of efficiency. For example, prior art frames for use in distending conventional disposable plastic garbage bags or the like are made up of a number of separate wire members which must be assembled and locked into position each time the container is to be used or repositioned. In addition to being awkward, such containers, by virtue of their many separate parts tend to be rendered useless through the loss of one or more of the parts. Additionally, such devices can be hazardous inasmuch as the members are often pivotally mounted to one another and may have sharp edges resulting in finger catching "scissor-type" action as they are being deployed or disassembled.

An additional problem common to consumer type refuse containers is their lack of mobility both during and after collection of refuse. Prior art designs are often unstable unless they are staked into the ground. Such devices inherently require uprooting each time the user desires to move it from one location to another in the process of collecting refuse. This can be extremely difficult in applications such as raking leaves wherein relatively frequent repositioning of the container is required. An additional shortcoming of such a device is its stability in only a single orientation i.e. the collection position, but not in the transporting position. This problem is particularly aggravated in situations when the container is full or nearly full of relatively heavy refuse. A related problem is that the bag is not fully supported in the transporting position and thus is susceptible to becoming detached from the frame or being ripped and thereby spilling the contents.

Finally, many prior art devices fail to provide versatility for the aged or physically infirm wherein the design allows the user to apply mechanical advantage thereto in repositioning it from the refuse collecting position to the transporting position. Most prior art devices require that the user bear the full weight of the container as well as its contents.

Representative of the best prior art are U.S. Pat. Nos. 3,106,303 to Finocchiaro, 3,170,183 to Leatherman, 3,697,030 to Schultz 3,934,803 to Paulus, Jr., and 4,006,928 to Beugin. The devices disclosed in these patents, although being useful in their specific intended applications, are chosen to collectively represent some of the above discussed shortcomings of the prior art as a whole.

U.S. Pat. No. 3,170,183 discloses a one piece dust pan and basket combination which is constructed of plastic to provide a sweeping kit which enables dirt or the like to be swept directly into a retention receptacle without the use of an additional dust pan. Two slots are provided in the receptacle which act as a hand grip for carrying the receptacle while in the dirt collecting position. The waste basket can be positioned upright for retaining refuse or tipped over on its side for receiving the dirt.

U.S. Pat. Nos. 3,934,803; 3,697,030 and 4,006,928 disclose frame-type refuse collectors which distend and coact with a collapsible garbage bag and permit sweeping of refuse directly in the mouth of the bag which is held open by the frame.

U.S. Pat. No. 3,106,303 discloses a collapsible cart for collecting relatively light and bulky refuse and allows transporting thereof through supportive wheels.

BRIEF DESCRIPTION OF THE INVENTION

The present invention relates to a portable dust pan and refuse container combination which overcomes the above described shortcomings of the prior art by providing a highly portable, stable yet inexpensive and light-weight container which employs an open mouthed, elongated flexible collection bag which is easily installed with and removed from the rest of the container. According to the present invention, the dust pan and refuse container combination comprises a bag supporting frame which distends and substantially encloses the bag, means which holds the mouth of the bag rigidly open for receiving refuse, two or more spaced, ground contacting wheels which are rotatably mounted to the frame on a common axis to permit selective rotational repositioning of the frame about the axis from a first, substantially vertical refuse transporting positioning to a second, substantially horizontal refuse collecting position and, finally, a dust pan which depends from the frame adjacent the mouth of the bag and projects angularly outwardly therefrom with respect to the line of elongation of the bag and which operates to abut the ground when the container is in the second position. This arrangement has the advantage of providing an inexpensive yet extremely strong, stable and highly mobile refuse collector and container which is very efficient and convenient to use in the collection of refuse while requiring a minimum of physical exersion both in transporting the container from a storage area such as the garage to the area of use such as the lawn and in transitioning the container between the first and second positions and back to the first position when the container is full of refuse.

According to the preferred embodiment of the invention, a handle is provided integrally with the frame which depends substantially outwardly therefrom both in the first and second positions. This arrangement has the advantage of allowing the user to readily grasp and reposition the container either from the sides or while addressing the container from the end holding the mouth of the bag. Additionally, this same handle facilitates pushing the container once fully loaded to an area for dumping of the refuse or removal of the bag from the frame.

According to another aspect of the invention, an additional pair of wheels are provided which are rotationally mounted on the frame on a second axis which is parallel to but spaced from the common axis and operative to coact with the first pair of wheels to support the container when in the first or upright position. This arrangement has the advantage of providing a container whose weight is fully supported on wheels when in the upright position.

According to another aspect of the present invention, first and second opposed side guard members are provided which depend angularly outwardly from the frame and coact with the dust pan to define a converging refuse guiding entrance to the mouth. This arrangement has the advantage of providing efficient acceptance of refuse from a direction angularly offset with the line of elongation of the bag and prevents spillage from around the mouth of the bag.

According to another aspect of the invention, the dust pan and refuse container is collapsible and adjustable to accommodate trash bags of varying dimensions and capacities. This arrangement has the advantage of providing a convenient, flexible container which collapses to minimize storage volume requirements by employing constituent elements (structural members) which operatively (pivotally) engage one-another.

According to still another aspect of the invention, the dust pan projects outwardly further than the side guard members mentioned herein above and includes a ground embracing edge at the outer terminus thereof. This extended portion acts as a cantilever as it bears against the ground thereby preventing refuse from escaping underneath the edge when a refuse collecting instrument such as a rake is passed toward the mouth of the bag and otherwise may catch the underside of the ground embracing edge.

These and other features and advantages of this invention will become apparent upon reading the following specification, which, along with the patent drawings, describes and discloses a preferred illustrative embodiment and an alternative embodiment of the invention in detail.

The detailed description of the specific embodiment makes reference to the accompanying drawings.

BRIEF DESCRIPTION OF THE DRAWINGS

FIG. 1 is a perspective view of the preferred embodiment of the inventive dust pan and refuse container illustrated in its first or refuse collecting position;

FIG. 2 is a side plan view of the dust pan and refuse container of FIG. 1 illustrating the container in its first or upright position (solid line) and in its second or refuse collecting position (dotted line);

FIG. 3 is a fragmented cross-sectional view of the dust pan and refuse container of FIG. 1 shown on an enlarged scale.

DETAILED DESCRIPTION OF THE SPECIFIC EMBODIMENTS

Figure 4:
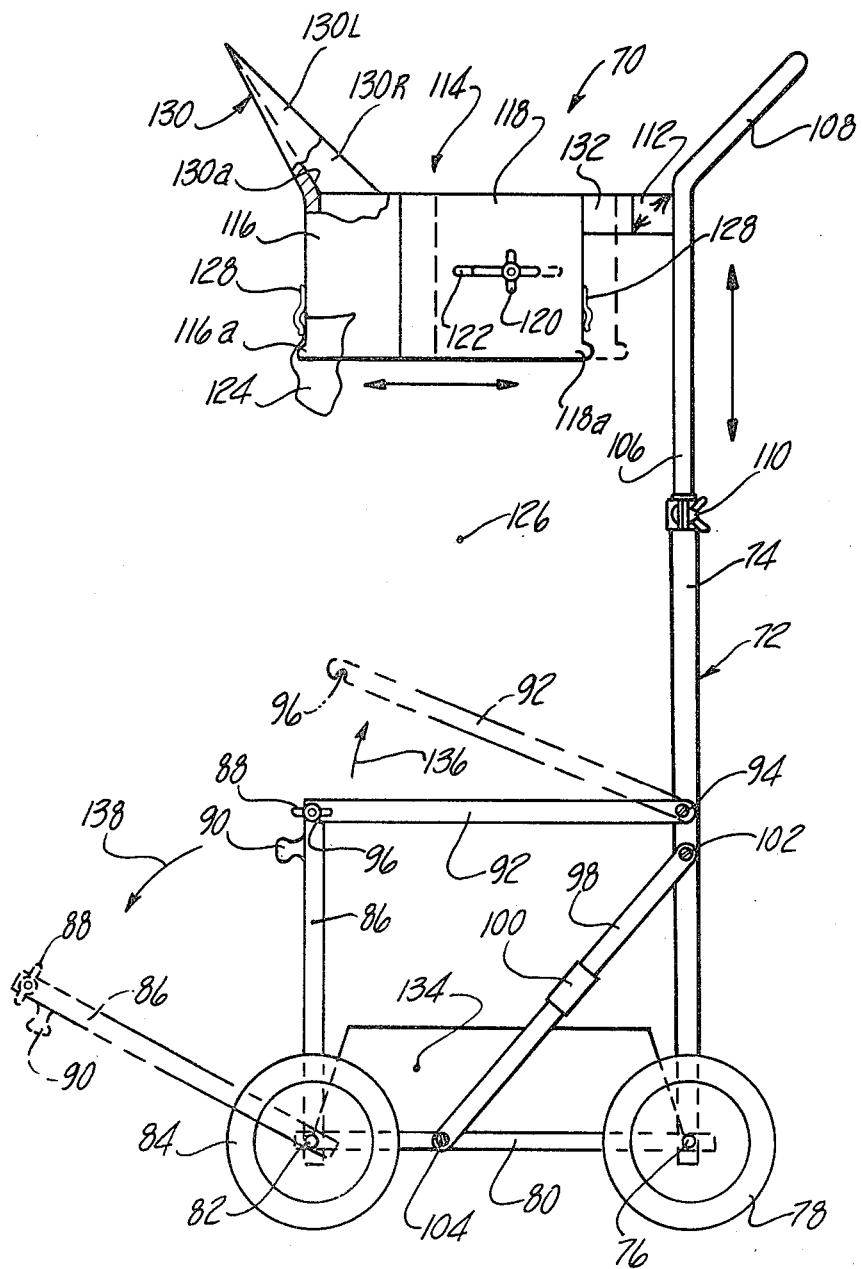
FIG. 4 is a side plan view of an alternative embodiment of the inventive dust pan and refuse container in an enlarged scale.

Referring to drawing FIGS. 1-3, a preferred embodiment of a combination dust pan and refuse container 10 (herein after referred to as container) is illustrated. Although container 10 is principally intended for consumer or household type applications, it is contemplated that it could also be employed for many commercial or industrial applications. The specific use for container 10 contemplated by the applicant is an aid in gathering, transporting and storing refuse or items which are scattered on the ground such as grass clippings, thatch, dust, dirt, leaves and the like.

Container 10 comprises a bag supporting frame 12 made up of four substantially parallel spaced elongated members 14a, 14b, 14c, 14d. Members 14 collectively define the edges of a refuse bag nesting area 16. Members 14c and 14d are interconnected by a rigidly fixed axle 18 which projects laterally outwardly therefrom in both directions to rotatably support a first pair of ground contacting wheels 20. Although only one wheel 20 is illustrated, it is to be understood that container 10 is substantially symmetrical and a second wheel 20 (not illustrated) is rotatably mounted on the opposite end of axle 18. Axle 18 defines a first rotational axis designated A. Likewise, members 14a and 14b are interconnected by a second axle 22 which is affixed therebetween and extends laterally therebeyond to rotatably support a second pair of ground contacting wheels 24. Axles 18 and 22 therefore act as structural members which maintain members 14 in their illustrated laterally fixed spaced relationship.

Longitudinal (between wheels 20 and 24) structural support is provided by a bottom bag supporting frame 26 which is interconnected between axles 18 and 22 and is constructed from a wire mesh having a number of parallel lateral members 28 and a number of parallel longitudinal members 30 at right angles to lateral members 28 and welded thereto to form a mesh or grate which is rigidly affixed to the remainder of frame 12. Axle 22 defines a second axis B which is substantially parallel to and spaced from axis A.

When container 10 is in its upright or first position as illustrated in FIG. 3, wheels 20 and 24 will all be contacting the ground designated 31 to provide a stable support therefor and permitting a high degree of mobility by virtue of the rotational mounting of wheels 20 and 24 upon axles 18 and 22.

Lateral structural support of container 10 is also supplied by an upper bag supporting frame 32 which, like bottom bag supporting frame 26 is a mesh formed of a number of parallel lateral members 34 affixed normally to a number of substantially parallel vertical members 36. Lateral members 34 are fixedly spaced between members 14a and 14b of frame 12. A lower bag supporting frame 38 is substantially identical to upper bag supporting frame 32, comprising a number of parallel lateral members 40 interconnecting members 14c and 14d of frame 12 normally affixed to a number of vertical members (not illustrated). The vertical members of lower bag supporting frame 38 are singularly integrally formed with associated longitudinal members 30 of bottom bag supporting frame 26 and vertical members 36 of upper bag supporting frame 32, i.e., each associated set of longitudinal members (30, 36 and not shown) are formed from a single "C" shaped length of wire.

Referring specifically to FIG. 3, the upper ends of members 14a and 14b are integrally interconnected by a handle 42 which extends upwardly and rightwardly therefrom. Spacing of members 14 is maintained at their end opposite wheels 20 and 24 by a bag supporting chute 44 which is constructed of a first pair of spaced angled members 44a and 44b and a second pair of spaced angled members 44c and 44d. Member 44a interconnects the upper ends of members 14b and 14c of frame 12, member 44b interconnects members 14a and 14d of frame 12, member 14c interconnects members 14a and 14b of frame 12 and member 44d interconnects members 14c and 14d of frame 12. Members 44a, 44b, 44c, and 44d collectively define a converging refuse inlet aperture generally designated 46. Additional structural support is provided by a wooden cross member 48 which interconnects members 14a and 14b of frame 12 adjacent the point at which members 14a and 14b transition into handle 42.

Member 44d of bag supporting chute 44 extends upwardly and leftwardly substantially further than the other members. This extension is defined for the purposes of the present application as a dust pan 50. Dust pan 50 comprises a lower portion 50a which transitions with member 44d of bag supporting chute 44 and has a relatively uniform cross section. Dust pan 50 also comprises an upper portion 50b which projects upwardly from lower portion 50a and has a transitioning cross-sectional area which terminates in a relatively sharp ground embracing edge 50c. In application, dust pan 50 operates as a cantilever as will be described in detail herein below.

The upper terminus of members 14c and 14d of frame 12 are closed by cup shaped plastic caps 52 or the like. The lower most portion of bag supporting chute 44 extends downwardly defining an extension 44e, the outer circumference of which includes a bag supporting surface 44f. The lower terminus of bag supporting chute 44 is of increased wall thickness as designated at 44g. An open mouthed, elongated flexible collection bag 52 is disposed within bag nesting area 16 and has its mouth rigidly held open by the insertion therein of extension 44e of bag supporting chute 44. An elastic band 54 passes around bag 52 near the mouth thereof and embracingly holds the bag 52 against surface 44f of bag supporting chute 44. This arrangement causes bag 52 to be partially distended and contained within bag nesting area 16 by the influence of the enclosing or surrounding frame 12. In the first or upright position, bag nesting area 16 is closed on the front (adjacent dust pan 50) and the back (adjacent handle 42) sides as well as the bottom by lower bag supporting frame 38, upper bag supporting frame 32 and bottom bag supporting frame 26, respectively. Although the lateral sides of frame 12 are open, bag 52 is prevented from escaping therethrough by a pair of bag restraining straps 56. Straps 56 are provided with buckles 58 whereby tension in strap 56 can be released and bag 52 removed laterally from bag nesting area 16 once elastic band 54 has been released from the mouth area of bag 52.

Operation of container 10 can best be understood by referring to FIG. 2 which illustrates container 10 both in its first or upright substantially vertical refuse transporting position (in solid line) and also in its second, substantially horizontal refuse collecting position (in dotted line). In transporting container 10, the user walks therebehind and grasps handle 42, pushing or pulling same. When container 10 is positioned near refuse that is to be collected, it is then rotated from the first position to the second position about axis A whereby wheels 24 are rotated counterclockwise to assume a position substantially above wheels 20. Ground embracing edge 50c of dust pan 50 will contact the ground 52 and will firmly bear there against by virtue of its cantilever design. It has been found that upper portion 50b will bend slightly at a point indicated by arrow 60 causing a spring action or preload of dust pan 50 as it bares against the ground 32 to prevent refuse being collected from escaping therebetween. It should be noted that handle 42 is designed in such a way as to project upwardly, both in the first and second positions of container 10, and thereby facilitating movement of container 10 and transitioning thereof between the positions. Additionally, when all of the refuse in the immediate area has been collected but more remains at a distance, rather than returning container 20 to the first position, it is contemplated that handle 42 can be grasped and rotated clockwise upwardly just enough to relieve the preload on dust pan 50 and then move container 10 to the new position for collecting additional refuse. This procedure is not recommended for moving container 10 great distances but only for moving, for example, from one location to another nearby location.

Because of the elongated design of frame 12, the center of gravity (designated cg) of the combined container 10 and refuse contained therein will be substantially nearer axis A than is handle 42. As is apparent to one of ordinary mechanical skill and intuition, handle 42 will provide a substantial mechanical advantage in repositioning of container 10 from the second position back to the first position. Thus, the aged or physically infirmed can employ container 10 with very little effort. When bag 52 is full, it is removed by loosening strap 56 at buckle 58 and sliding the mouth portion of bag 52 downwardly away from bag supporting chute 44 while elastic band 54 has been stretched radially outwardly. The mouth of bag 52 can then be closed by conventional ties or other methods and the filled, closed bag can be removed from bag nesting area 16 by sliding laterally out of frame 12.

Referring to FIG. 4, an alternative embodiment of a combination dust pan and refuse container 70 (hereinafter referred to as container) is illustrated. Like container 10 illustrated in FIGS. 1–3, container 70 is principally intended for consumer or household type applications. The operation of container 70 is, therefore, identical to that described herein above with a few exceptions as will be described hereinbelow. All of the claimed inventive features can be equally applied to both the preferred embodiment and the alternative embodiment of the invention. Several of the inventive features are described and illustrated in detail only in one of the embodiments of the invention, it being understood that such features are equally applicable to the other embodiment as will be obvious to one of ordinary skill in the art in view of the present specification.

Container 70 comprises a bag supporting frame 72 and a conventional compliant, disposable trash or garbage bag. Frame 72 comprises two substantially parallel laterally spaced elongated members 74, the lower terminus of which are rigidly affixed to a laterally oriented stub axle shaft 76 which retains members 74 in the illustrated laterally spaced relationship. It should be noted that a reverse plan view of the alternative embodiment of the invention illustrated in FIG. 4 is the exact compliment of FIG. 4 and thus has been omitted for the sake of brevity.

Stub axle 76 extends laterally outwardly beyond members 74 and rotatably supports the rear (right handmost) ends of a pair of longitudinally oriented elongated members 80 as well as a pair of ground contacting wheels 78 which are free to rotate about axle shaft 76 but are prevented from axial displacement there along by entrapment between member 74 and suitable fastener means at each end of shaft 76 such as threaded nuts, cotter pins, swedging or the like. Members 80 are substantially the same extent as are members 74. A second stub axle shaft 82 passes through aligned apertures in the left-hand-most ends of members 80. Like axle shaft 76, axle shaft 82 projects laterally outwardly beyond members 80 and rotatably support a second pair of ground contacting wheels 84 between the means and members 80 to prevent axial displacement of wheels 84 along axle shaft 82.

Axle shaft 82 passes through a laterally aligned bore within the lower portion of a front bag supporting access door 86, the lateral extent of which interspaces members 80. Door 86, which is constructed of wood, molded plastic or other suitable material, is supported by axle shaft 82 and is free to rotate thereabout unless otherwise restrained. Near the uppermost extent of the lateral surfaces of door 86 are a pair of opposed axially aligned thumb screws 88. A knob 90 is affixed to the left-hand-most surface of access door 86. Door 86 is retained in the illustrated position (solid line) by a pair of longitudinally extending support members 92 which are substantially parallel to one another as well as members 80. The right-hand ends of members 92 are rotatably secured to member 74 by screws 94 or the like. The left-hand ends of members 92 have downwardly opening notches 96 which, in the assembled (solid line) position cause the left-hand ends of members 92 to be embracingly secured between access door 86 and thumb screws 88.

A pair of diagonally oriented members 98 provide rigidity to bag supporting frame 72. Each member 98 is articulated by an over center snap acting hinge 100, the structure and operation of which is well known in the art and will not be elaborated upon here. One end of each member 98 is affixed to its associated member 74 by a screw 102 at a point intermediate axle shaft 76 and screw 94. The other end of each member 98 is attached to its associated member 80 by means of a screw 104 at a point intermediate axle shafts 76 and 82.

In their illustrated position, members 98 rigidly support members 74 and 80 in their illustrated positions. When members 92 are clamped to access door 86 by thumb screws 88, the entire assembly is rigid. Members 80, 92 and 98 are constructed of aluminum bar stock having a rectangular cross section. The function of this particular arrangement is described in detail herein below in the description of operation of the alternative embodiment of the invention.

A bottom bag supporting frame (not illustrated) defines a horizontally planar bottom to frame 72 and is supported by and traverses the lateral space between members 80. The actual structure of the bottom bag supporting frame is substantially identical to frame 26 described herein above and illustrated in FIGS. 1 and 2. Likewise, a vertically oriented, planar upper bag supporting frame (not illustrated) is also provided which is supported by and is interspaced between members 74. The upper bag supporting frame is substantially identical in structure and function to upper bag supporting frame 32 described herein above and illustrated in FIG. 1. Detailed description of the structure of the frames are deleted here to avoid duplication.

Members 74 are constructed of tubular metal such as aluminum and openly terminate upwardly to telescopingly receive a pair of upper vertical members 106 which are integrally formed from a single piece of slightly smaller aluminum tubing in a generally inverted U-shape configuration, the upper terminus of which defines a handle 108 which extends upwardly and rightwardly therefrom. A thumb screw clamp 110 is provided in the upper terminus of each member 74 which can be tightened to cause the upper portion of member 74 to snuggly embrace the lower portion of member 106 nested therein. Added structural support is provided by a wooden cross member 112 which interconnects the upper portion of upper members 106 of frame 72 and is secured thereto by fastener means such as screws (not illustrated).

Cross member 112 supports a converging refuse inlet aperture, generally designated 114, which is defined by nestingly engaged front and rear bag supporting members 116 and 118 respectively. Members 116 and 118 are opposed and generally "U" shaped in horizontal cross section, the free legs of which slidably engage one another to define aperture 114. A pair of opposed axially aligned thumb screws 120 threadably engage the legs of front member 116, passing laterally outwardly through elongated slots 122 in the legs of rear member 118. When thumb screws 120 are tightened, they cause the legs of rear member 118 to be trapped between thumb screws 120 and the legs of front member 116.

The lower terminus of front and rear bag supporting members 116 and 118 are of increased wall thickness as designated at 116a and 118a respectively. An open mouthed, elongated collection bag (illustrated fragmentarily) 124 is disposed within a refuse bag receiving area, generally designated 126, which extends downwardly to the uppermost surface of the bottom bag supporting frame. Bag 124 has its mouth rigidly held open by a lower terminus of combined front and rear members 116 and 118. A number of spring acting clips 128 are externally peripherally spaced about and have one end affixed to members 116 or 118, and depend downwardly from their attachment point in cantilever fashion. The free ends of clips 128 are biased against members 116 and 118 to collectively form bag clamping mechanism therewith. Bag 124 is held in the illustrated position by passing the open end thereof upwardly between spring clips 128 and the portions of members 116 and 118 adjacently associated therewith.

Front bag supporting member 116 extends upwardly and leftwardly substantially further than member 118. This extension is defined for the purposes of the present application as a dust pan 130. Dust pan 130 defines a refuse guiding ramp 130a (illustrated in a locally broken away section) which, when dust pan and refuse container 70 is in the trash collecting position, guides refuse into inlet aperture 114. Laterally spaced, longitudinally oriented left and right dust pan support webs 130L and 130R are provided to structurally reinforce dust pan 130 as well as lateral refuse guidance.

The alternative embodiment of the invention, as illustrated in FIG. 4, operates as follows. Dust pan and refuse container 70 is adjustable both in vertical height as well as the area of refuse inlet aperture 114 to accommodate bags 124 of varying dimensions and capacities. The area of refuse inlet aperture 114 is adjustable by loosening thumb screws 120 and slidingly repositioning rear bag supporting member 118 forwardly or rearwardly to assume a combined (with member 116) outer circumferential dimension which is slightly less than the mouth or opening of bag 124. Subsequent retightening of thumb screws 120 assures that the new area of inlet aperture 114 will remain the same. Note that only rear supporting member 118 is displaceable with respect to frame 72. Supporting member 116 is affixed to frame 72 (specifically to cross member 112) by a bridge supporting member 132 by fastening means such as screws (not illustrated). Thus, front bag supporting member 116 is at all times maintained in the fixed orientation illustrated with respect to upper members 106.

Variations in the capacity or height of bag 124 can be accommodated by attaching bag 124 to members 116 and 118 via spring clips 128, loosening thumb screws 110 and sliding upper members 106 downwardly into members 74 until the lower most extent of bag 124 abuts the upper most surface of the bottom bag supporting frame. At this point, thumb screws 110 are retightened and refuse container 70 is ready for use. Bag 124 is contained within bag receiving area 126 by bottom and upper bag supporting frames, access door 86, members 92, members 98, and a pair of laterally spaced upstanding planar guide members 134 which depend from members 80. Guard members 134 are substantially trapezoidal in shape and are spaced substantially to the same extent as are members 80.

Once bag 124 is filled and the operator desires to remove it from container 70, thumb screws 88 are loosened, members 92 are rotated clockwise to assume a substantially vertical orientation (as is illustrated in phantom and arrow designated 136, and access door 86 is rotated counterclockwise to assume a substantially horizontal orientation (as is illustrated in phantom and arrow designated 138. Note that members 92 and access door 86 are illustrated in phantom in intermediate positions (during the process of repositioning). With members 92 temporarily in the substantially vertical position and access door 86 in the substantially horizontal position, bag 124 is freely accessible to the user from the front (left as illustrated in FIG. 4) of refuse container 70 and can be simply removed by pulling the upper or mouth portion of bag 124 downwardly, disengaging it from clips 128 and over the area of increased thickness 116a and 118a of bag support members 116 and 118 respectively. Bag 124 can then be tied closed if desired and freely removed forwardly from frame 72.

When fully assembled and including a bag 124, dust pan and refuse container 70 is employed substantially as described in the detailed description herein above relating to FIGS. 1–3 and a discussion thereof is deleted here to avoid duplication. The axis of stub axle shaft 76 should be considered as equivalent to second rotational axis B and the axis of stub axle shaft 82 whould be deemed to be the first rotational axis designated A.

Dust pan and refuse container 70 is collapsible to minimize its space or volume requirements during storage thereof. Collapsing of container 70 is accomplished as follows. Starting with container 70 assembled as illustrated in solid line in FIG. 4, thumb screws 88 are loosened slightly. Thumb screws 110 are loosened and members 74, i.e. when the upper most terminus of members 74 abut the lower most surface of cross member 112. Thumb screw 110 is then retightened. The user then grasps members 98 adjacent joint 100 and pulls upwardly and leftwardly as illustrated in FIG. 4 to disengage the over center snap action joint 100 whereby the portion of member 98 on either side of joint 100 will become skewed with respect to one another. Screws 94, 102 and 108 are tight enough to prevent lateral displacement of members 92 and 98 respectively but allow their rotational displacement if not otherwise prevented. As joint 100 is repositioned upwardly and leftwardly, the entire assembly of members 80 and 92, axle shaft 82, wheels 94, access door 86 and guards 134 will rotate generally clockwise in a scissors fashion as will be now apparent to one skilled in the art in light of the present specification. In the fully collapsed position, axle shaft 82 will have rotated clockwise seventy or eighty degrees from the illustrated position about axle shaft 76.

In the collapsed configuration, container 70 can be easily stored or transported. To restore container 70 to its assembled condition, the above described process is simply reversed.

Bag supporting chute 44 (as well as members 116 and 118) can be constructed of discrete members or alternatively integrally molded from high quality plastic, nylon or the like. Although virtually any type of material can be employed to construct frame 12 (72), aluminum tubing is considered best and medium gauge steel wire can be used for constructing frames 26, 32 and 38 once they have been protected from corrosion such as by plating or painting. Lightweight and structural integrity are important primary design considerations in practicing the present invention.

It is to be understood that the invention has been described with reference to a specific preferred embodiment which provides the features and advantages previously described, and that such specific and alternative embodiments are susceptible of modification as will be apparent to those skilled in the art. For example, the dimensions and proportions as suggested in the drawings and specification can be significantly varied without departing from the spirit of the present invention. Accordingly, the foregoing is not to be construed in a limiting sense.

What is claimed is:

1. A portable dust pan and refuse container for collecting and transporting refuse material in a disposable open-mouthed, elongated, flexible collection bag comprising:
   a bag support platform for supporting the bottom of the bag and having a front edge and a rear edge;
   a front bag support wall and a rear bag support wall respectively connected to the front and rear edges of the bag support platform and extending generally perpendicularly therefrom in spaced apart relation from one another to define lateral side openings through which a bag filled with refuse may be removed therefrom;

a bag support chute mounted on the front bag support wall and the rear bag support wall and spaced from the platform at a distance generally equal to the height of the disposable bag;

means for releasably securing a bag on the bag support chute with the open-mouth of the bag extended and registered with the bag support chute for entry of refuse material therein;

first and second bag restraining means extending respectively between the front bag support wall and the rear bag support wall intermediate the bag support platform and the bag support chute to provide effective lateral side restraint of the bag within the bag nesting area between the front and back bag support walls, at least one of said bag restraining means being releasable to enable subsequent removal of the filled refuse bag through the lateral opening;

a pair of spaced ground contacting wheels rotatably mounted on the container about an axis generally adjacent the leading edge of the bag support platform to permit selective rotational repositioning of the container about said axis from a first substantially vertical refuse transporting position to a second substantially horizontal refuse collecting position; and a dust pan carried by the container and projecting outwardly from the bag support chute and operating to abut the ground when the container is in the refuse collecting position whereby refuse material may be swept into the disposable bag.

2. The dust pan and refuse container of claim 1, further comprising handle means depending substantially upwardly from the rear bag support wall to facilitate movement of the container when in the substantially vertical refuse transporting position and to facilitate rotational repositioning of the container about the wheel axis between the refuse transporting position and the refuse collecting position.

3. The dust pan and refuse container of claim 1, further comprising at least one additional wheel rotatably mounted on the container generally adjacent the rear edge of the bag support platform and operative to coact with the pair of wheels to support the container for rolling movement in the vertical refuse transporting position.

4. The dust pan and refuse container of claim 1, wherein the dust pan defines an elongated ground embracing edge at the outer terminus thereof disposed substantially parallel to the wheel axis.

5. The dust pan and refuse container of claim 1, wherein the bag restraining means comprises flexible straps at least one of which has a separable buckle whereby at least one of the straps may be separated to release the bag for removal through the lateral side opening.

6. The dust pan and refuse container of claim 1, wherein said means for releasably securing a bag on the bag support chute is an elastic band which passes around the bag and retains the bag against an increased wall thickness portion of the bag support chute.

7. The dust pan and refuse container of claim 1, wherein the bag support platform, and the front and rear bag support walls are constructed of a wire mesh material effective to provide a maximum of strength with a minimum of weight.

* * * * *